(12) United States Patent
Bottoni et al.

(10) Patent No.: US 11,336,378 B2
(45) Date of Patent: May 17, 2022

(54) TECHNIQUES FOR APPLYING EQUALIZATION TO SIGNALS RECEIVED OVER MULTIMODE FIBER LINKS

(71) Applicant: Cisco Technology, Inc., San Jose, CA (US)

(72) Inventors: Fabio Bottoni, Milan (IT); Alessandro Cavaciuti, San Donato Milanese (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/851,553

(22) Filed: Apr. 17, 2020

(65) Prior Publication Data
US 2021/0328684 A1 Oct. 21, 2021

(51) Int. Cl.
| | | |
|---|---|---|
| *H04B 10/00* | (2013.01) | |
| *H04B 10/69* | (2013.01) | |
| *H04B 10/2581* | (2013.01) | |
| *H04B 10/50* | (2013.01) | |
| *H04J 14/00* | (2006.01) | |

(52) U.S. Cl.
CPC ..... *H04B 10/6971* (2013.01); *H04B 10/2581* (2013.01); *H04B 10/50* (2013.01)

(58) Field of Classification Search
CPC .................. H04B 10/2581; H04B 10/6971
See application file for complete search history.

(56) References Cited

U.S. PATENT DOCUMENTS

| | | |
|---|---|---|
| 8,654,636 B2 | 2/2014 | Conway et al. |
| 8,963,573 B2 | 2/2015 | Achkir et al. |
| 2004/0028158 A1 | 2/2004 | Fujimori et al. |
| 2007/0104490 A1* | 5/2007 | Ghiasi ............. H04B 10/25137 398/159 |
| 2010/0221017 A1 | 9/2010 | Ghiasi |
| 2011/0130032 A1 | 6/2011 | Mazzini et al. |
| 2012/0102239 A1* | 4/2012 | Huang ............. H04L 12/40169 710/14 |
| 2014/0079111 A1* | 3/2014 | Hui .................. H04L 25/03044 375/234 |
| 2017/0288779 A1* | 10/2017 | Tatum .................. H04B 10/40 |

OTHER PUBLICATIONS

Diego Criveli et al., "Architecture and Experimental Evaluation of a 10Gb/s MLSD-Based Transceiver for Multimode Optical Fibers", IEEE International Conference on Communications, ISBN: 978-1-4244-2075-9, May 2008, 6 pages.
Extended European Search Report and Search Opinion in counterpart European Application No. 21168843.7, dated Sep. 20, 2021, 12 pages.

* cited by examiner

*Primary Examiner* — Daniel G Dobson
(74) *Attorney, Agent, or Firm* — Edell, Shapiro & Finnan, LLC

(57) ABSTRACT

Presented herein are methodologies for using legacy optical fiber for 10 Gigabit Ethernet or higher data rates. The methodology includes obtaining an electrical signal derived from optical-to-electrical conversion of an optical signal that was transmitted over, and received from, an optical fiber; and applying an equalization process to the electrical signal, wherein the equalization process is of a type that is designed to equalize received signals that were transmitted via a copper cable.

20 Claims, 8 Drawing Sheets

LRM OPTICS (AFTER 280M OM1)
AFTER EQUALIZATION DESIGNED FOR SIGNALS
TRANSMITTED OVER COPPER CABLE AND RETIMING

LRM OPTICS (AFTER 280M OM1)
WITHOUT EQUALIZATION

US 11,336,378 B2

TECHNIQUES FOR APPLYING EQUALIZATION TO SIGNALS RECEIVED OVER MULTIMODE FIBER LINKS

TECHNICAL FIELD

The present disclosure relates to data networking using optical fiber, and more particularly to selectively applying an equalization process to signals received via the optical fiber.

BACKGROUND

Optical multi-mode (OM) fibers are described using a system of classification determined by the ISO 11801 standard, and are presently classified as OM1, OM2, OM3, and OM4. OM1 has a core/cladding relationship of 62.5/125 µm, and OM2 has a core/cladding relationship of 50/125 µm. These fibers support applications ranging from Ethernet (10 Mbit/s) to Gigabit Ethernet (1 Gbit/s) and, because of their relatively large core size, are suitable for use with LED transmitters. Newer deployments often use laser-optimized 50/125 µm multi-mode fiber, called OM3. Fibers that meet this latter standard provide sufficient bandwidth to support 10 Gigabit Ethernet (GbE) up to 300 meters. Optical fiber manufacturers have greatly refined their manufacturing processes since the ISO 11801 standard was issued, and cables are presently being made that support 10 GbE up to 550 meters, and such cables are designated as OM4. OM3 and OM4 fiber is now also used for 25 GbE, thus providing 10/25 GbE data rates.

Notably, OM1 and OM2 fibers are still widely present within the networking infrastructure of campuses/enterprises/buildings and it is not uncommon for customers to be reluctant to purchase and install new (i.e., OM3, OM4) fiber to deploy 10 GbE (or 25 GbE). Presently, distances up to 220 m over OM1/OM2 fibers can be covered by using 10 G-long reach multi-mode (LRM) optics. In many implementations, signals transported over OM1/OM2 via 10 G-LRM are then processed with, among other things, electronic dispersion compensation (EDC) that is optimized for such optically transported signals.

DESCRIPTION OF EXAMPLE EMBODIMENTS

Overview

Presented herein are methodologies for using legacy optical fiber for 10 Gigabit Ethernet or higher data rates. The methodology includes obtaining an electrical signal derived from optical-to-electrical conversion of an optical signal that was transmitted over, and received from, an optical fiber; and applying an equalization process to the electrical signal, wherein the equalization process is of a type that is designed to equalize received signals that were transmitted via a copper cable.

A device or apparatus is also described. The device may include a network interface unit configured to enable communications via a network; a memory configured to store logic instructions; and a processor, when executing the logic instructions, configured to: obtain an electrical signal derived from optical-to-electrical conversion of an optical signal that was transmitted over, and received from, an optical fiber; and apply an equalization process to the electrical signal, wherein the equalization process is of a type that is designed to equalize received signals that were transmitted via a copper cable.

Example Embodiments

Figure 1:
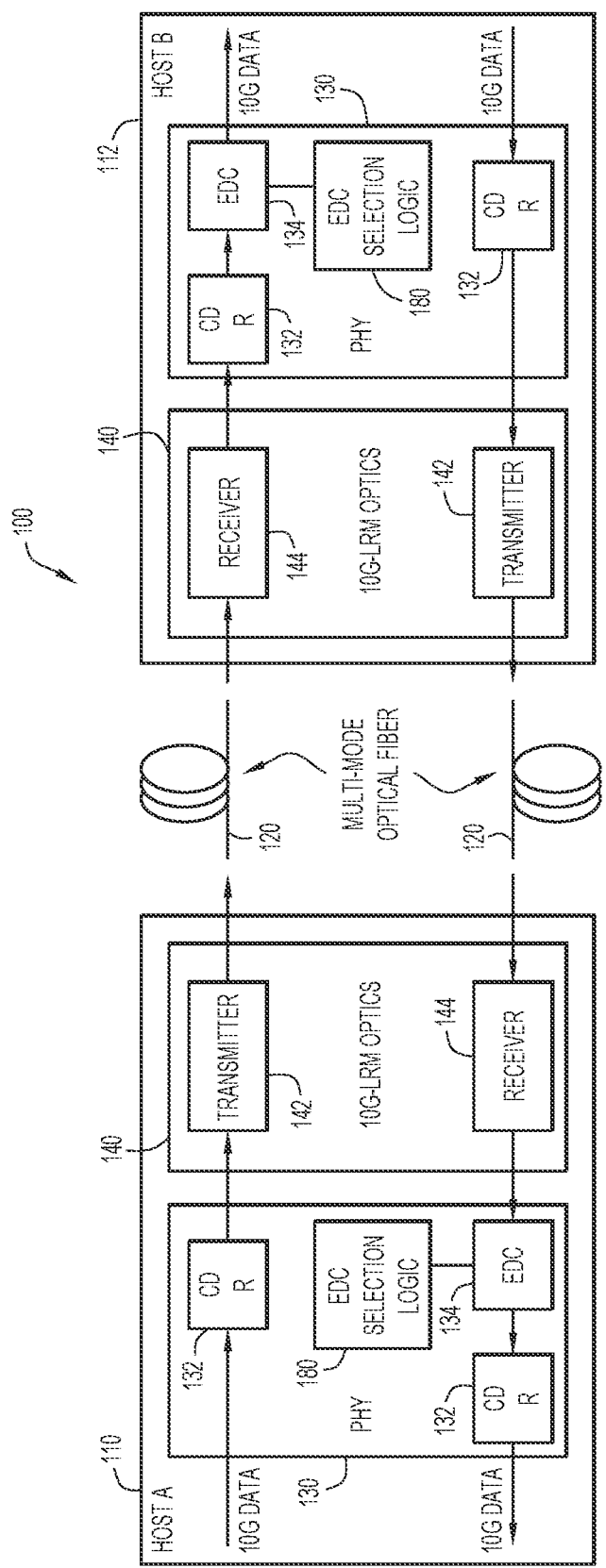
FIG. 1 is a block diagram of a network topology using optical fiber and an equalization process designed to equalize received signals that were transmitted via a copper cable in accordance with an example embodiment.

FIG. 1 is a block diagram of a network topology 100 using optical fiber and an equalization process designed to equalize received signals that were transmitted via a copper cable in accordance with an example embodiment. Host A 110 is communicatively coupled with host B 112 via multimode optical fiber 120, which may be of the OM1/OM2 variety. Host A 110 includes a physical (PHY) 130 component (e.g., a chip or chip set configured for switching or routing). On a transmit side, PHY 130 includes a clock and data recovery (CDR) module 132, and on the receive side, PHY 130 includes an electronic dispersion compensation (EDC) module 134 and another CDR module 132. As shown, the transmit side of PHY 130 receives data at, e.g., a 10 G rate.

Host A 110 further includes an optics module 140 which may be, e.g., a 10 G-LRM small form factor pluggable device that plugs into PHY 130, or a small form factor pluggable device that has a linear transfer function in its optical-to-electrical conversion portion. Optics module 140 includes an optical transmitter 142 that converts electronic signals into optical signals suitable to be transmitted over optical fiber 120. Optics module 140 also includes a receiver 144 that converts optical signals received via optical fiber 120 into electrical signals that are then supplied to EDC module 134 and CDR module 132 on the receive side of PHY 130.

Host B 112 comprises similar elements as host A 110, and for purposes of brevity will not be described separately.

PHY 130 still further includes EDC selection logic 180, the function of which is described in detail below in connection with FIG. 6. At a high level, EDC selection logic 180 is configured to determine whether an optics module 140 is plugged into the PHY 130, and when an optics module is plugged into the PHY, and supports 10 G-LRM optics, to cause the EDC module 140 to apply an equalization process, to the 10 G data, designed to equalize received signals that were transmitted via a copper cable (i.e., not optical cable).

As noted, OM1/OM2 fibers are still widely present within campuses/enterprises/buildings and some customers are reluctant to pull new fiber to deploy 10 GbE. Distances up to 220 m over legacy OM1/OM2 fibers, for 10 GbE, can be covered by using 10 G-LRM optics.

Notably, 10 G-LRM optics require platforms equipped with a specific electronic dispersion compensation equalizer (called hereafter "LRM equalizer").

As newer OM3/OM4 optical fiber supplants the older OM1/OM2 optical fiber, chip manufacturers are phasing out platforms with the specific "LRM equalizer". As such, in a transition from 10 G to newer 10/25 G platforms, 10 G legacy OM1/OM2 multimode links will fall short.

At the same time, those same chip manufacturers may still provide an equalizer designed to equalize received signals that were transmitted via a copper cable (i.e., not optical cable). More specifically, a PHY in a given host may be configured to also support what is known as Direct Attach Copper (DAC) cables, and 10 G data transmitted via DAC.

In accordance with an embodiment, in the event PHY 130 on, e.g., host B 112, does not support LRM equalization, and yet optics module 140 is plugged into the PHY 130, EDC selection logic 180 is configured to enable the equalizer for data sent via DAC cable to process data received via the optics module 140. This scheme thus provides 10 G 220 m support over OM1/OM2 fibers.

Supporting OM1/OM2 multimode fiber links on 10/25 G platforms (not equipped with a LRM equalizer) provides users with an operational 10 G network with existing OM1/OM2 fiber.

Figure 2B:
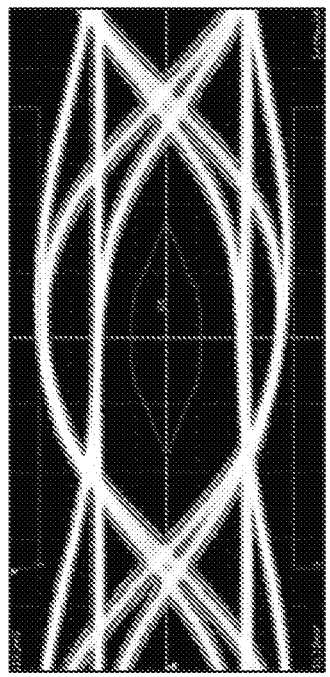
FIG. 2B is an eye diagram showing signals sent via LRM optics with equalization designed to equalize received signals that were transmitted via a copper cable in accordance with an example embodiment.
Figure 2A:
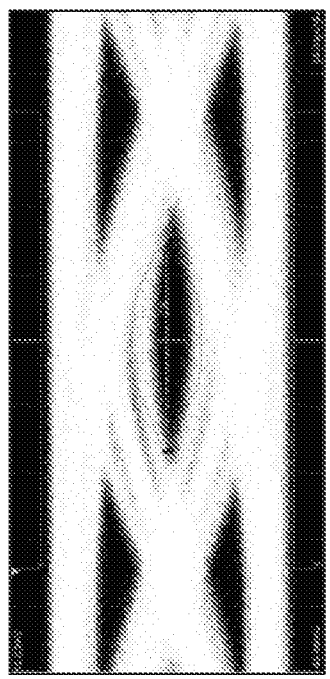
FIG. 2A is an eye diagram showing signals sent via LRM optics without equalization.

FIG. 2A is an eye diagram showing signals sent via LRM optics without the aid of an LRM equalizer. As can be seen (compared to FIG. 2B, for example), there is relatively little discernment among the individual waveforms, making subsequent decoding more error prone.

FIG. 2B is an eye diagram showing signals sent via LRM optics (and recovered after having been propagated through OM1 optical fiber) aided by equalization designed to equalize received signals that were transmitted via a copper cable in accordance with an example embodiment. As can be seen, there is significantly less noise or distortion among the individual waveforms, thus leading to improved subsequent decoding. Note, again, that the equalization that was applied to obtain the eye diagram of FIG. 2B is equalization optimized for signals transmitted via copper cable, e.g., DAC cables.

Figure 3:
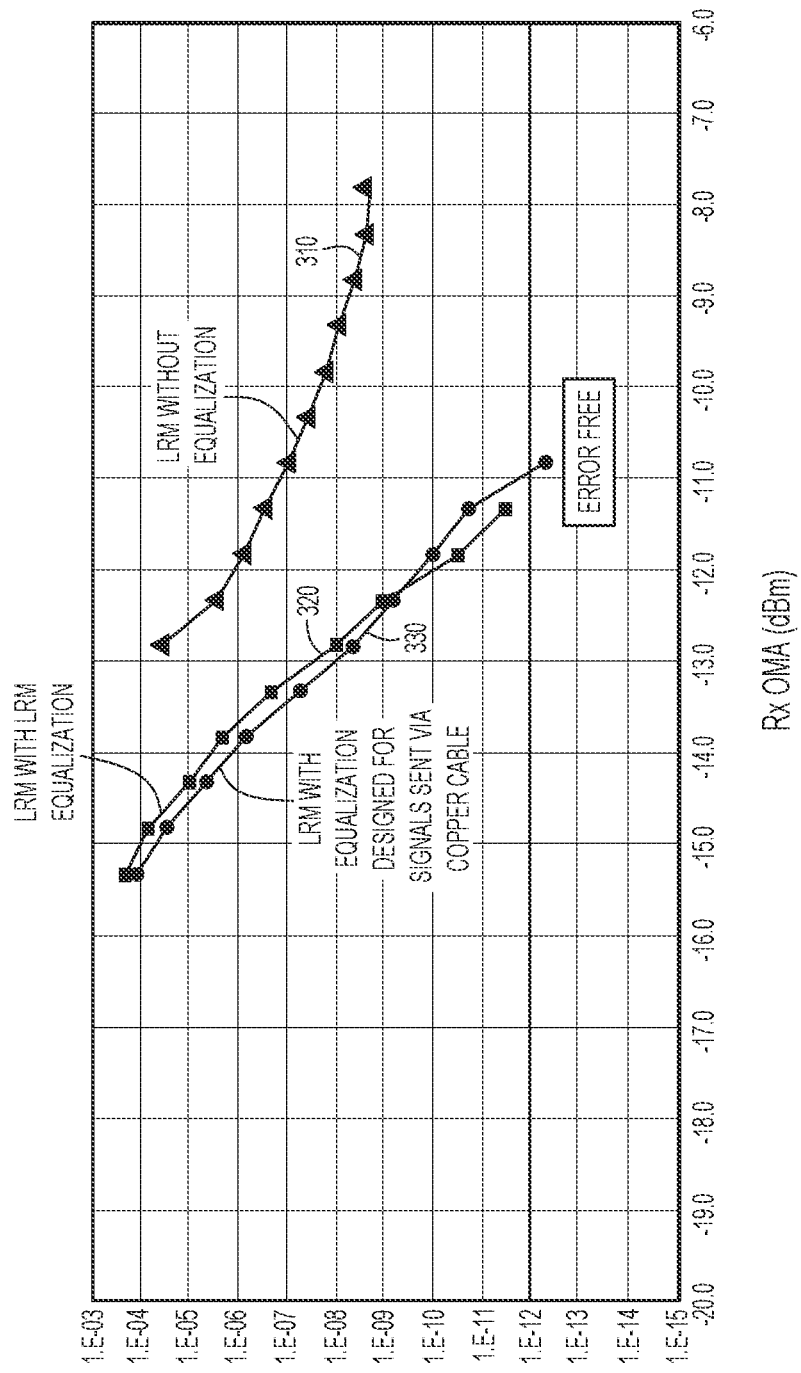
FIG. 3 is a graph comparing bit error rate scenarios for signals sent via LRM optics with no equalization, signals sent via LRM optics and aided by LRM equalization, and signals sent via LRM optics and aided by equalization designed to equalize received signals that were transmitted via a copper cable in accordance with an example embodiment.

In this same vein, FIG. 3 is a graph depicting bit error rate (BER) scenarios for signals sent via LRM optics with no equalization, signals sent via LRM optics aided by an LRM equalizer, and signals send via LRM optics and aided by equalization designed to equalize received signals that were transmitted via a copper cable in accordance with an example embodiment. More specifically, curve 310 represents LRM optics alone (without any equalization). This approach does not meet a target BER of, e.g., 1e-12 over OM1 optical fiber. On the other hand, curve 320 represents signals sent via LRM optics and aided by an LRM equalizer, and curve 330 represents signals sent via LRM optics and aided by an equalizer optimized for signals transmitted via, e.g., DAC cables. Both of these latter approaches show similar performances, showing the effectiveness of an equalizer not designed to handle signals transmitted over optical fiber, such as an equalizer designed to equalize signals received via DAC cables.

10 G-LRM optics (IEEE 802.3aq) are specified to support stressed sensitivity tests that are meant to emulate the OM1 worst-case channel responses. Such channel responses can be divided into the following groups: precursor, split-symmetrical, and postcursor.

In a case wherein a mode conditioning patchcord is used at launch, it has been found that 5% of the links (considering the fiber distribution used within the 802.3aq standard) are potentially representative of a split-symmetrical channel response.

It has also been found that 10 G-LRM optics aided by an equalizer not designed to handle signals transmitted over optical fiber (e.g., an equalizer optimized for DAC), active on the 10/25 G platform side, is able to support a pre-cursor and a post-cursor channel response.

Thus, the solution described herein enables the following coverage:
 100% of 220 m OM2 links
 95% of 220 m OM1 links (due to the split-symmetrical channel response)

Figure 4A:
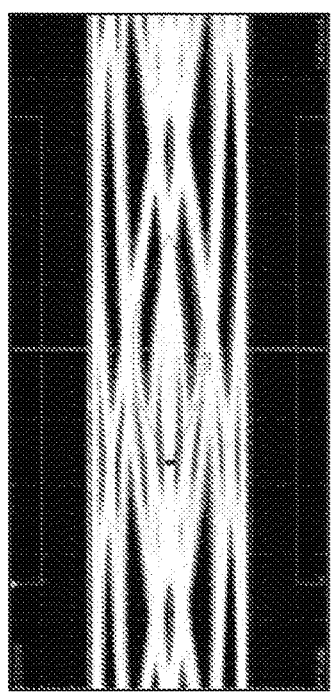
FIG. 4A is an eye diagram showing a postcursor stressor signal measured at a receiver input of 10 G-LRM optics in accordance with an example embodiment.

FIG. 4A is an eye diagram showing a postcursor stressor signal measured at a receiver input of 10 G-LRM optics in accordance with an example embodiment. The postcursor stressor signal is configured and calibrated to be in line with the IEEE 802.3aq standard specifications (Table 68-5).

Figure 4B:
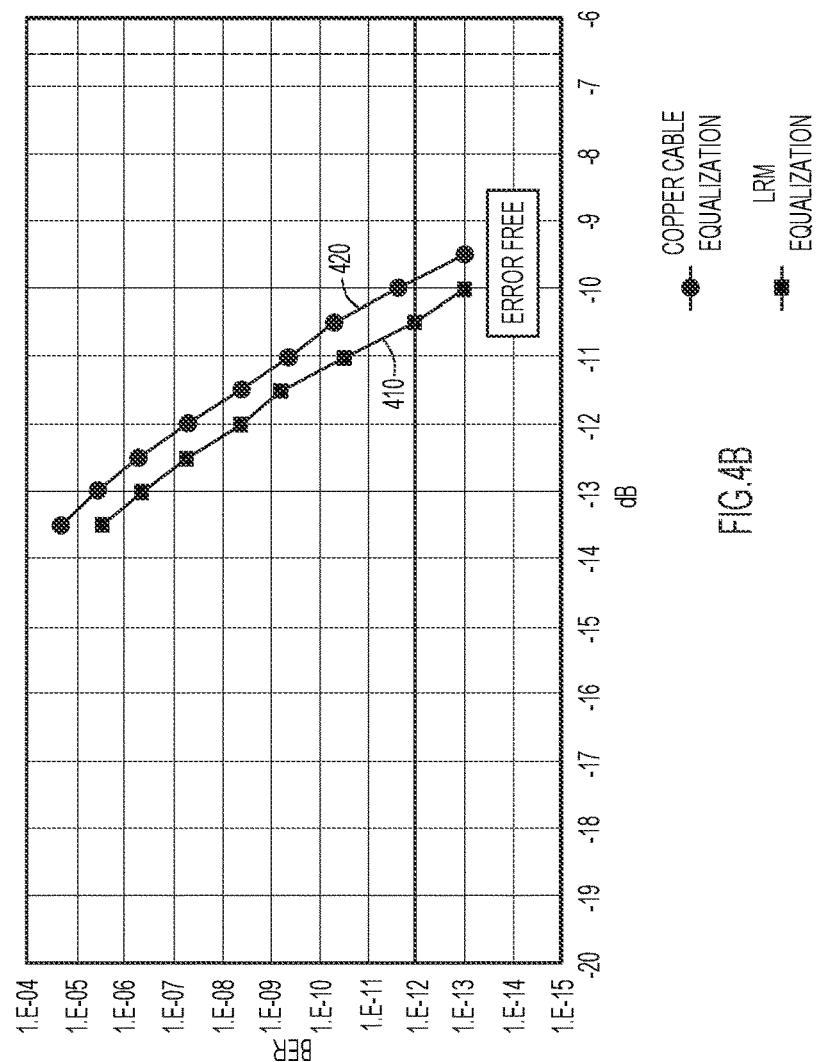
FIG. 4B is a graph that compares LRM equalization and equalization designed to equalize received signals that were transmitted via a copper cable after processing the postcursor stressor signal in accordance with an example embodiment.

FIG. 4B is a graph that compares LRM equalization and equalization designed to equalize received signals that were transmitted via, e.g., a DAC cable after processing the postcursor stressor signal in accordance with an example embodiment. Curve 410 represents LRM equalization and curve 420 represents LRM optics aided by equalization designed to equalize signals transmitted via copper cable. As can be seen, curve 420 and curve 410 show similar performance with a 1 dB penalty at BER=1e-12 for curve 420.

Figures 5A, 5B:
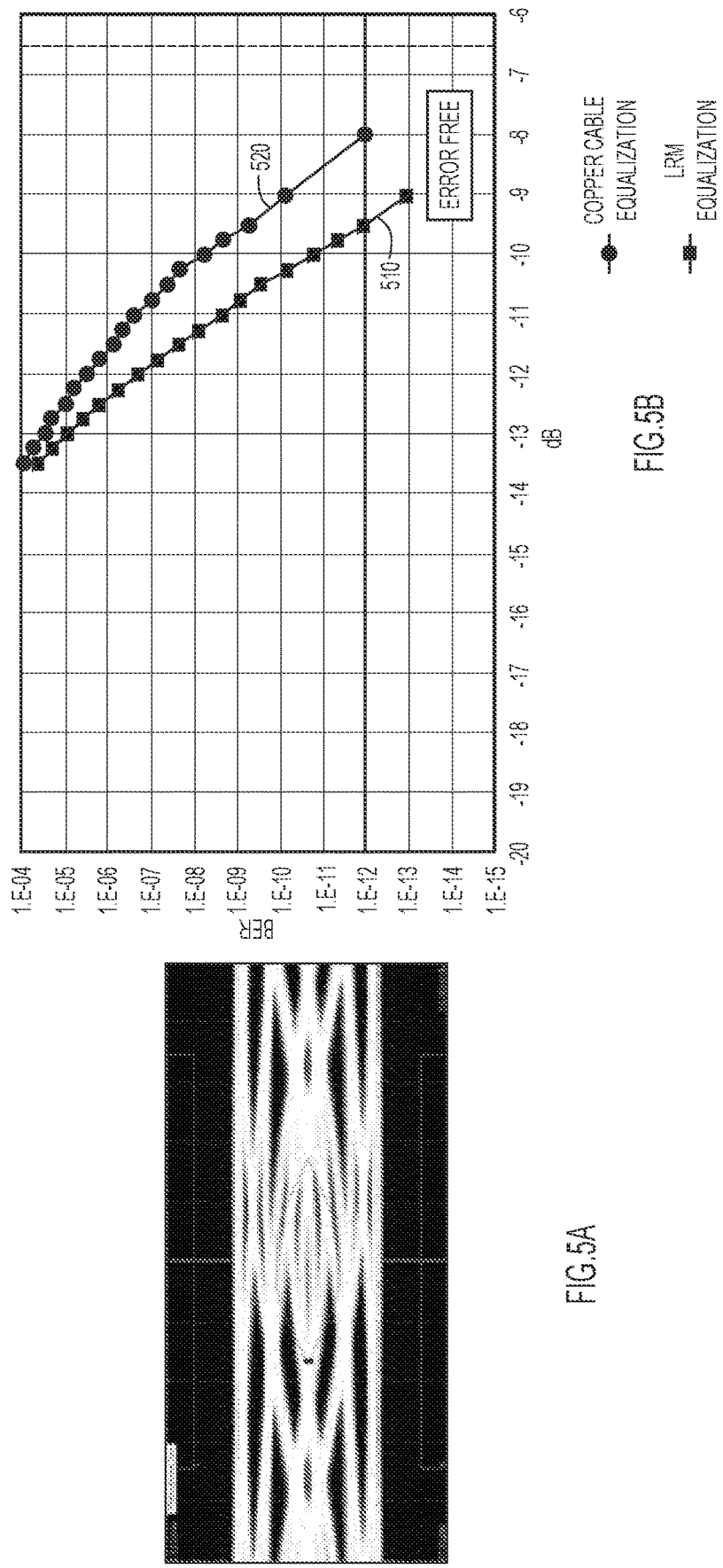
FIG. 5A is an eye diagram showing a precursor stressor signal measured at a receiver input of 10 G-LRM in accordance with an example embodiment.
FIG. 5B is a graph that compares LRM equalization and equalization designed to equalize received signals that were transmitted via a copper cable after processing the precursor stressor signal in accordance with an example embodiment.

FIG. 5A is an eye diagram showing a precursor stressor signal measured at a receiver input of 10 G-LRM optics in accordance with an example embodiment. The precursor stressor signal is configured and calibrated to be in line with the IEEE 802.3aq standard specifications (Table 68-5).

FIG. 5B is a graph that compares LRM equalization and equalization designed to equalize received signals that were transmitted via a copper cable after processing the precursor stressor signal in accordance with an example embodiment. Curve 510 represents LRM equalization and curve 520 represents LRM optics aided by equalization designed to equalize signals transmitted via copper cable. As can be seen, curve 520 and curve 510 show similar performance with a 1.5 dB penalty at BER=1e-12 for curve 520.

Figure 6:
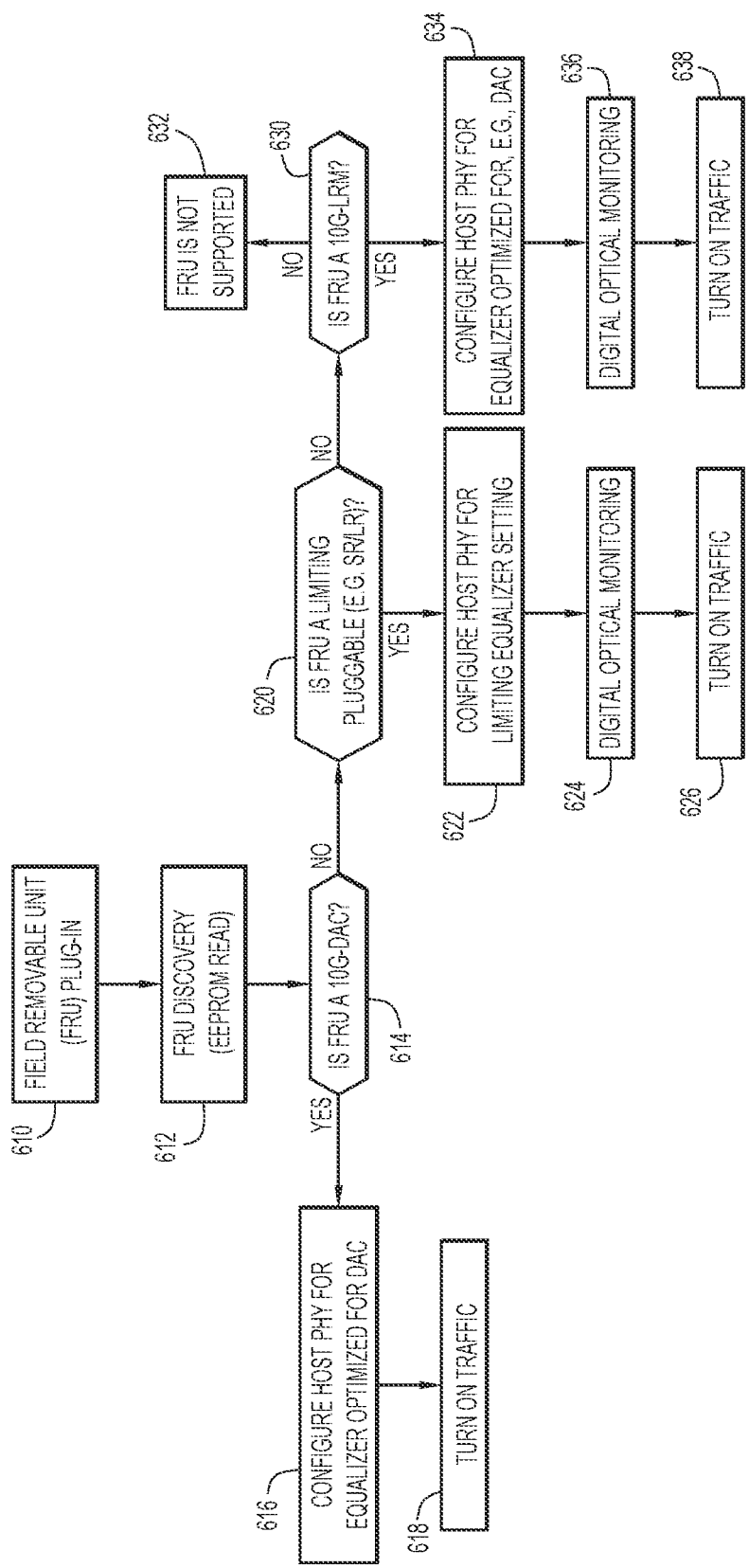
FIG. 6 is a flowchart depicting a series of operations to allow signals received over optical fiber to be processed by equalization designed to equalize received signals that were transmitted via a copper cable in accordance with an example embodiment.

FIG. 6 is a flowchart depicting a series of operations to allow signals received over optical fiber to be processed by an equalization process designed to equalize received signals that were transmitted via a copper cable in accordance with an example embodiment. At 610, a field removable unit (FRU), such as a small form factor pluggable (SFP) device (e.g., optics module 140), is plugged into a host PHY. At 612, the host (e.g., EDC selection logic 180) performs a FRU discovery routine (e.g., the host PHY reads the FRU's EEPROM) to determine what kind of device has just been plugged in.

At 614, the host determines if the FRU is, e.g., a 10 G-DAC. If yes, then at 616, the host configures its PHY for an equalizer optimized or designed for signals sent via DAC. And, at 618, the host turns on traffic to begin receiving data via the FRU.

If, on the other hand, the host determines, at 614, that the FRU is not a DAC FRU, then at 620 the host determines if the FRU is a limiting pluggable device (e.g., a short reach (SR) or long reach (LR)) FRU. If yes, then at 622, the host configures its PHY for a limiting equalizer. At 624, the host begins digital optical monitoring. And, at 626, the host turns on traffic to begin receiving data via the FRU.

If, at 620, the host determines, at 620, that the FRU is not a limiting pluggable device, then at 630 the host determines if the FRU is a 10 G-LRM FRU pluggable device. If not, the host concludes, at 632, that the FRU is not supported. If the FRU is a 10 G-LRM FRU (pluggable device), then at 634, the host configures its PHY for an equalizer optimized or designed for signals sent via copper cable (e.g., DAC). At 636, the host begins digital optical monitoring. And, at 638, the host turns on traffic to begin receiving data via the FRU.

Figure 7:
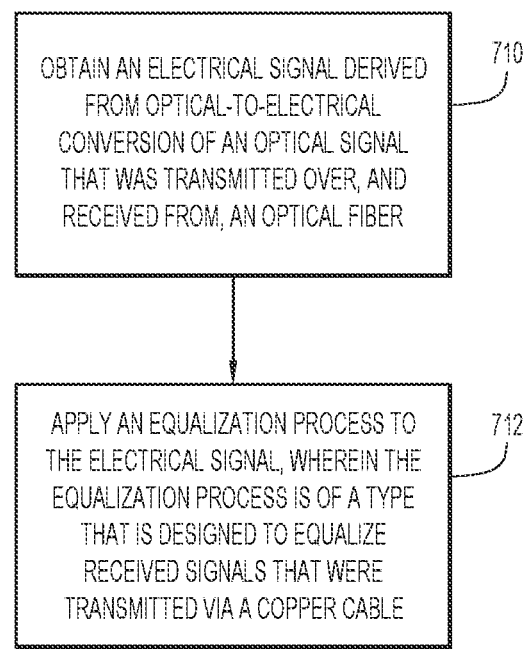
FIG. 7 is another flowchart depicting a series of operations for processing a signal that was transmitted over an optical fiber in accordance with an example embodiment.

FIG. 7 is another flowchart depicting a series of operations for processing signal that was transmitted over an optical fiber in accordance with an example embodiment. At 710, a host, or PHY of a host, obtains an electrical signal derived from optical-to-electrical conversion of an optical signal that was transmitted over, and received from, an optical fiber. At 712, the host applies an equalization process to the electrical signal, wherein the equalization process is of a type that is designed to equalize received signals that were transmitted via a copper cable.

Figure 8:
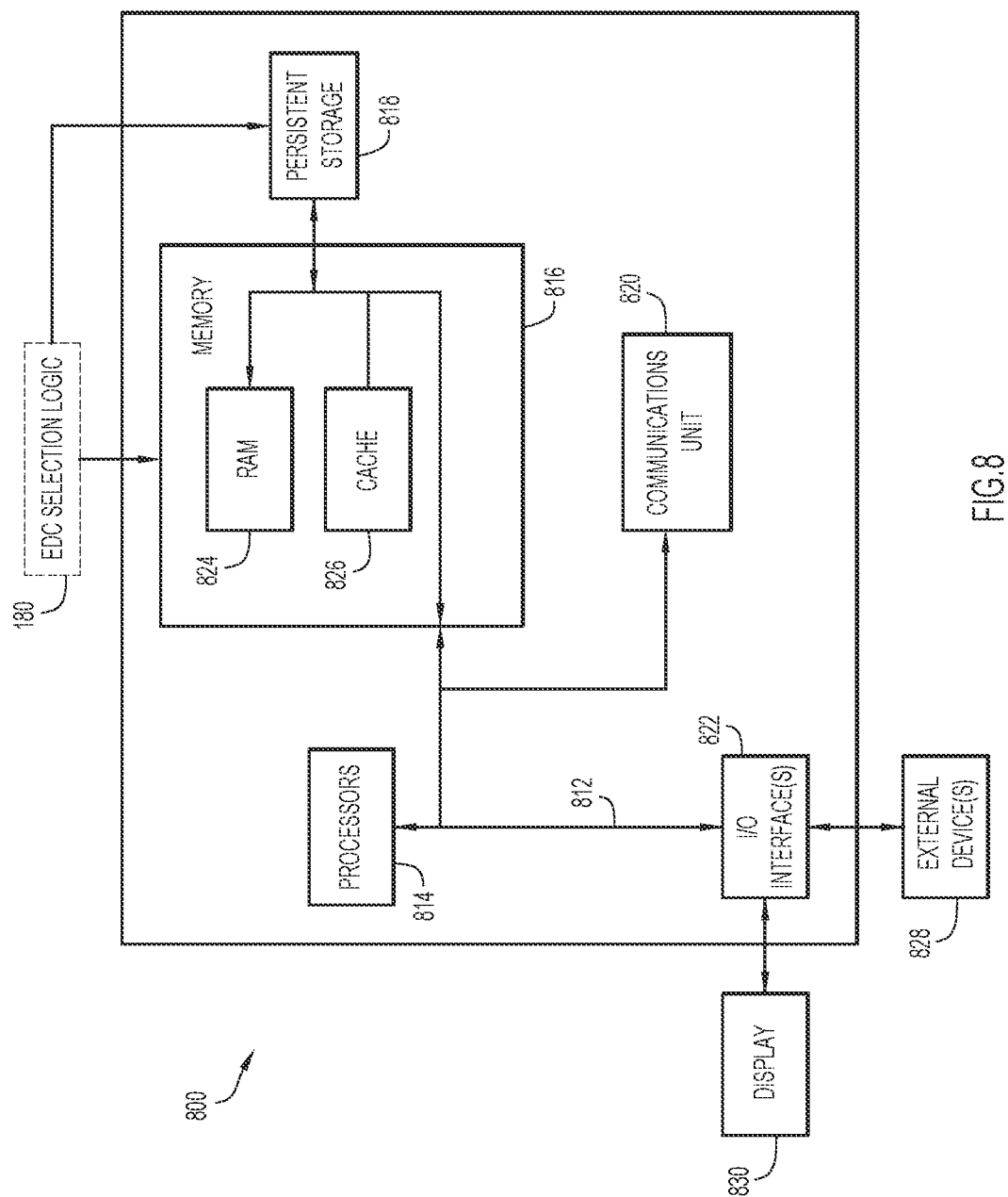
FIG. 8 depicts a device that executes electronic dispersion compensation selection logic in accordance with an example embodiment.

FIG. 8 depicts a device (e.g., host 110 A or host B 112) that executes EDC selection logic 180 in accordance with an example embodiment. It should be appreciated that FIG. 8 provides only an illustration of one embodiment and does not imply any limitations with regard to the environments in which different embodiments may be implemented. Many modifications to the depicted environment may be made. Indeed, in many implementations of a device configured to host EDC selection logic 180, much of the hardware described below may not be needed.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the EDC selection logic 180 may be stored in memory 816 or persistent storage 818 for execution by processor(s) 814.

One or more programs may be stored in persistent storage 818 for execution by one or more of the respective computer processors 814 via one or more memories of memory 816.

The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes obtaining an electrical signal derived from optical-to-electrical conversion of an optical signal that was transmitted over, and received from, an optical fiber; and applying an equalization process to the electrical signal, wherein the equalization process is of a type that is designed to equalize received signals that were transmitted via a copper cable.

In an embodiment, the equalization process is configured to not be fully optimized to compensate for an optical channel response resulting in a split-symmetrical output pulse.

In an embodiment, the equalization process is configured to compensate for an optical channel response resulting in an optical pulse with pre-cursor components In an embodiment, the equalization process is configured to compensate for an optical channel response resulting in an optical pulse with post-cursor components.

The equalization process may be optimized for equalizing signals obtained via a direct attach copper (DAC) cable.

In one implementation, the optical signal may be received via an OM1 or an OM2 optical fiber.

In an implementation, wherein the optical signal carries Ethernet frames at at least 10 gigabits/second.

In an embodiment, the optical-to-electrical conversion has a linear transfer function.

In one implementation, the optical-to-electrical conversion is obtained through a device that is compliant with IEEE 802.3aq.

[ow] In an embodiment, the device may be a small form factor pluggable device.

In an embodiment, the method may further include selecting the equalization process in response to detecting that the device has been plugged into a host.

In another form, an apparatus may also be provided in accordance with an embodiment. The apparatus may include a network interface unit configured to enable communications via a network; a memory configured to store logic instructions; and a processor, when executing the logic instructions, configured to: obtain an electrical signal derived from optical-to-electrical conversion of an optical signal that was transmitted over, and received from, an optical fiber; and apply an equalization process to the electrical signal, wherein the equalization process is of a type that is designed to equalize received signals that were transmitted via a copper cable.

In an embodiment, the equalization process may be optimized for equalizing signals obtained via a direct attach copper (DAC) cable.

In an embodiment, the optical signal may be received via an OM1 or an OM2 optical fiber.

In an embodiment, the optical signal carries Ethernet frames at at least 10 gigabits/second.

In an embodiment, the optical-to-electrical conversion may be obtained through a device that is compliant with IEEE 802.3aq.

In an embodiment, the apparatus includes a PHY portion, and the processor is further configured to select the equalization process in response to detecting that a device has been plugged into the PHY portion In still another form, a non-transitory computer readable storage media is provided that is encoded with instructions that, when executed by a processor, cause the processor to obtain an electrical signal derived from optical-to-electrical conversion of an optical signal that was transmitted over, and received from, an optical fiber; and apply an equalization process to the electrical signal, wherein the equalization process is of a type that is designed to equalize received signals that were transmitted via a copper cable.

In an embodiment, the equalization process may be optimized for equalizing signals obtained via a direct attach copper (DAC) cable.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining an electrical signal derived from optical-to-electrical conversion of an optical signal that was transmitted over, and received from, an optical fiber; and
   applying an equalization process to the electrical signal, wherein the equalization process is designed to equalize received signals that were transmitted via a copper cable.

2. The method of claim 1, wherein the equalization process is configured to not be fully optimized to compensate for an optical channel response resulting in a split-symmetrical output pulse.

3. The method of claim 1, wherein the equalization process is configured to compensate for an optical channel response resulting in an optical pulse with pre-cursor components.

4. The method of claim 1, wherein the equalization process is configured to compensate for an optical channel response resulting in an optical pulse with post-cursor components.

5. The method of claim 1, wherein the equalization process is optimized for equalizing signals obtained via a direct attach copper (DAC) cable.

6. The method of claim 1, wherein the optical signal is received via an OM1 or an OM2 optical fiber.

7. The method of claim 6, wherein the optical fiber has a length of up to 220 meters long.

8. The method of claim 1, wherein the optical signal carries Ethernet frames at up to 10GBE.

9. The method of claim 1, wherein the optical-to-electrical conversion has a linear transfer function.

10. The method of claim 1, wherein the optical-to-electrical conversion is obtained through a device that is compliant with IEEE 802.3aq.

11. The method of claim 10, wherein the device is a small form factor pluggable device.

12. The method of claim 10, further comprising selecting the equalization process in response to detecting that the device has been plugged into a host.

13. An apparatus, comprising:
    a network interface unit configured to enable communications via a network;
    a memory configured to store logic instructions; and
    a processor, when executing the logic instructions, configured to:
       obtain an electrical signal derived from optical-to-electrical conversion of an optical signal that was transmitted over, and received from, an optical fiber; and
       apply an equalization process to the electrical signal, wherein the equalization process is designed to equalize received signals that were transmitted via a copper cable.

14. The apparatus of claim 13, wherein the equalization process is optimized for equalizing signals obtained via a direct attach copper (DAC) cable.

15. The apparatus of claim 13, wherein the optical signal is received via an OM1 or an OM2 optical fiber.

16. The apparatus of claim 13, wherein the optical signal carries Ethernet frames 10GBE.

17. The apparatus of claim 13, wherein the optical-to-electrical conversion is obtained through a device that is compliant with IEEE 802.3aq.

18. The apparatus of claim 13, wherein the apparatus includes a PHY portion, and the processor is further configured to select the equalization process in response to detecting that a device has been plugged into the PHY portion.

19. A non-transitory computer readable storage media encoded with instructions that, when executed by a processor, cause the processor to:
    obtain an electrical signal derived from optical-to-electrical conversion of an optical signal that was transmitted over, and received from, an optical fiber; and
    apply an equalization process to the electrical signal, wherein the equalization process is designed to equalize received signals that were transmitted via a copper cable.

20. The non-transitory computer readable storage media of claim 19, wherein the equalization process is optimized for equalizing signals obtained via a direct attach copper (DAC) cable.

* * * * *

UNITED STATES PATENT AND TRADEMARK OFFICE
CERTIFICATE OF CORRECTION

PATENT NO. : 11,336,378 B2
APPLICATION NO. : 16/851553
DATED : May 17, 2022
INVENTOR(S) : Fabio Bottoni et al.

Page 1 of 1

It is certified that error appears in the above-identified patent and that said Letters Patent is hereby corrected as shown below:

In the Claims

Claim 8, Column 12, Line 4, please replace "Ethernet frames at up to 10GBE." with --Ethernet frames up to 10GBE.--

Claim 16, Column 12, Line 36, please replace "Ethernet frames 10GBE." with --Ethernet frames up to 10GBE.--

Signed and Sealed this
Twenty-seventh Day of September, 2022

Katherine Kelly Vidal
*Director of the United States Patent and Trademark Office*